Patented Oct. 24, 1950

2,526,907

UNITED STATES PATENT OFFICE 2,526,907

COPRECIPITATION OF SILICA-ALUMINA

Louis Schmerling, Riverside, Ill., assignor to Universal Oil Products Company, Chicago, Ill., a corporation of Delaware No Drawing. Application September 29, 1948, Serial No. 51,854

5 Claims. (Cl. 252—453)

This invention relates to a process for the production of a silica-alumina composite and to the product thereof which is particularly useful as a catalyst in promoting hydrocarbon conversion reactions and especially in catalyzing the cracking of relatively high molecular weight hydrocarbons and petroleum distillates to produce therefrom products useful as motor fuels. More specifically, the invention concerns the production of catalysts containing a silica-alumina co-gel having a low density and being especially characterized by their purity, ease of preparation and their production from relatively inexpensive sources of alumina as starting material.

In the manufacture of silica-alumina composites for catalytic purposes, it is often essential, in order to obtain a composite having the desired activity and/or other qualities desired for the particular catalyst, that an activated form of alumina be utilized as starting material. For this purpose, therefore, it is often found that the common and inexpensive sources of alumina, such as the trihydrate and other hydrated forms of alumina, are not particularly desirable or even ultilizable in the method of preparation. Moreover, the cheap forms of alumina may also contain impurities and foreign substances other than alumina, which may have a deleterious effect on the catalytic activity of the ultimate silica-alumina composite. Thus, many aluminas offered on the market contain iron (generally as iron oxide), sodium, calcium, barium, silicon, etc., which in many catalytic uses seriously reduce the activity and/or thermal stability of the catalyst prepared from such sources of alumina.

A silica-alumina composite containing sodium or iron, for example, introduced into the composite via the sodium contained in the alumina, is not as active as a cracking catalyst and is not as resistant to high temperatures as the corresponding silica-alumina catalysts in which the sodium or iron contaminants are absent. Likewise, many of the aluminas presently available, such as, the mono-, di- and tri-hydrates, are relatively less desirable than the activated forms of alumina for catalyst production purposes, and it therefore becomes desirable to utilize an alumina which has been converted previous to the catalyst preparation or during the process of preparation to the activated form of alumina. The present invention has as one of its primary objectives the preparation of a silica-alumina catalyst composite prepared from an intermediate aqueous suspension of an alumina sol formed by the hydrolysis of a basic aluminum salt of an organic acid, utilizing one of the inexpensive forms of alumina hereinabove referred to as the starting material in its preparation and from which said impurities have been removed during the conversion of the alumina starting material to said aqueous alumina sol.

Another object of the invention is to prepare a catalyst comprising a composite of alumina and silica by means of a simplified procedure in which the reactants are admixed in the form of their aqueous solutions to provide for intimate and thorough admixing of said reactants.

Still another object of the invention is to prepare a composite catalyst consisting of silica and alumina for utilization as an active hydrocarbon conversion catalyst.

In accordance with one of its embodiments, the present invention relates to a process for the preparation of an alumina-silica composite, which comprises admixing an aqueous alkali metal silicate with an aqueous dispersion of alumina sol containing a dissolved ionizable acid having a dissociation constant below about $1 \times 10^{-3}$ to thereby form an alumina-silica co-gel.

A more specific embodiment of the invention concerns a method of manufacturing an alumina-silica composite which comprises admixing an aqueous solution of sodium silicate with an aqueous dispersion of alumina sol containing the organic acid formed by hydrolyzing a basic aluminum salt of an organic acid having a dissociation constant below about $1 \times 10^{-3}$.

Still another more specific embodiment concerns a process for manufacturing an alumina-silica hydrocarbon cracking catalyst which comprises admixing an aqueous solution of sodium silicate with the aqueous product of hydrolyzing basic aluminum acetate in the presence of sufficient water to disperse the resulting aluminum sol uniformly in the resulting aqueous solution of acetic acid thereby forming a co-gel of alumina and silica, drying the resultant co-gel, and calcining the same at a temperature of from about 300° to about 800° C., to form said alumina-silica composite catalyst.

Other embodiments and objects referring to specific aspects of the present invention will be hereinafter referred to in greater detail in the following further description of the present process and the catalyst product thereof.

The process herein provided for the production of an alumina-silica composite involves the coprecipitation of alumina and silica gels by admixing an aqueous solution of an alkali metal silicate with an aqueous dispersion of an alumina sol containing dissolved in said aqueous dispersion an organic acid having a dissociation constant below about $1\times10^{-3}$. Thus, by means of the above simple mixing procedure, a co-gelation reaction is obtained to form a composite of alumina and silica gels which may thereafter be recovered and subjected to further treatment for the production of the silica-alumina catalyst composite herein specified. The presence of an organic acid in the aqueous alumina sol, by virtue of hydrolyzing the basic aluminum salt of said organic acid (hereinafter described) reacts by acid-base neutralization with the alkali metal silicate to form an intermediate aqueous silica sol which substantially simultaneously undergoes transformation to silica gel, in the presence of the water-soluble electrolyte in solution. The alkali metal ions of the silicate reactant, herein provided, when introduced into the aqueous dispersion of the alumina sol causes gelation thereof substantially simultaneously with the formation of said silica gel. The mixture of alumina and silica gels forming almost concomitantly is herein referred to as an alumina-silica co-gel.

The co-precipitation of the alumina and silica gels produces a mixture thereof with the two components in intimate association such that upon subsequent calcination of the composite whereby a catalytically active alumina-silicate combination is believed to be formed, the centers of catalytic activity are evenly distributed throughout the mass of the alumina-silicate composite. The co-precipitation or co-gelation of the catalyst components is believed to be the underlying factor in the present catalyst having an excellent catalytic activity and thermal stability.

One of the primary reactants of the present process, the aqueous dispersion of alumina sol containing dissolved in the aqueous solution an organic acid having a dissociation constant less than about $1\times10^{-3}$, is most conveniently prepared by the hydrolysis of a basic aluminum salt of an organic acid having the above dissociation constant. The product of the hydrolytic reaction containing at least two equivalents of the organic acid, may be utilized as such and commingled with the alkali metal silicate solution or additional amounts of said acid or other organic acid having a dissociation constant of less than $1\times10^{-3}$ may be added to the aqueous sol and utilized in the co-gelation reaction.

The basic aluminum salt of the organic acid is formed by reacting an alumina starting material, containing gamma aluminum oxide, such as an impure alumina ore, exemplified, for example, by the least expensive natural source of alumina, the trihydrate, is mixed with an organic acid of at least 60% by weight concentration (preferably a low molecular weight member of the fatty acid series, such as formic and acetic acids) in a quantity corresponding to an excess over the theoretical molar ratio required for converting said alumina to the monobasic acid salt thereof. The mixture of acid and alumina starting materials is thereafter heated at a temperature in excess of about 150° C. up to about 300° C., while maintaining the ambient pressure sufficiently superatmospheric to provide liquid phase conditions in the reaction mixture. Suitable organic acids utilizable in the process to form the basic aluminum salt of the acid include the mono-, dicarboxylic acids such as the mono-, di-, and trichloroacetic acids, oxalic acid, malonic acid, succinic acid, tartaric acid and others. Acids of the fatty acid series having ionization constants less than $1\times10^{-3}$ are preferred, such acids as formic and acetic acids being especially preferred in the formation of the salt. At least four molecular proportions of acid to alumina must necessarily be charged into the reaction mixture to provide for the production of a monobasic salt of the acid, and preferably this ratio of acid to alumina is above the theoretical requirement, from about 6 to 1 to about 12 to 1 in order to obtain maximum conversion at a reasonable rate.

The method of preparing the basic aluminum salt of the organic acid as above outlined provides a means of preparation in which many of the impurities present in the original alumina charging stock are converted to the salts of the organic acid employed in the preparation of the basic aluminum acid salt and enables the use of an impure aluminum ore containing impurities which normally would have a deleterious effect on the catalytic activity of the final catalyst composite if used directly therein. The method, furthermore, provides for the possible use of cheaper forms of alumina containing said impurities which otherwise have a rather limited commercial market. Many of the salts of the acid used and of the impurities contained in the original alumina ore, are soluble in the acid and may thus be separated from the basic aluminum acid salt which is generally insoluble in the acid used.

The salts of the metallic impurities other than those soluble in the excess acid are dissolved in the aqueous alumina sol formed in the subsequent hydrolytic reaction stage of the process and do not precipitate with the alumina gel upon treating the aqueous sol suspension with a geling agent. When the alumina gel or the co-precipitate of the alumina and silica co-gels is subsequently filtered, salts of the metallic impurities such as ferric ions remain in the filtrate and are thus separated from the alumina product which is retained on the filter. The resulting recovered composite of alumina and silica co-gel is a highly purified material especially suitable for use as a catalyst and contains little or none of the impurities present in the original alumina ore from which the basic aluminum salt was prepared.

The reaction mixture formed upon treating alumina with the organic acid reagent, comprising a mixture of the excess acid and the basic aluminum salt of the acid, usually insoluble in the excess acid, may be filtered to remove excess acid or merely admixed with water and treated in accordance with subsequent stages of the present process to convert the basic aluminum salt of the acid to the aqueous alumina sol. The reaction mixture containing the basic aluminum acid salt and excess acid may be filtered to remove the product salt and the filter cake washed with a suitable solvent for the acid such as water, or the mixture may be subjected to distillation or mere heating to vaporize the excess acid from the mixture, preferably at a sub atmospheric pressure to vaporize substantially all of the acid therefrom. Alternatively, the entire reaction mixture containing the excess acid may be reserved for the subsequent hydrolytic treatment of the salt contained in the mixture to form the aqueous dispersion of alumina sol for utilization in the subsequent co-gelation reaction.

In the formation of the alumina sol by hydrolyzing the intermediate basic aluminum acid salt, said salt, or the reaction mixture containing the organic acid in which the salt is formed is merely heated in the presence of water in which it is practically insoluble, at temperatures above the boiling point of the mixture (and therefore, at superatmospheric pressures to maintain the water in liquid phase) until hydrolysis is complete, usually indicated by the formation of a clear or translucent aqueous dispersion of the alumina sol.

Temperatures of from about 150° to about 300° C. are generally sufficient at said above pressures to effect the hydrolytic reaction and the corresponding conversion periods are from about one-half to about 10 hours. The quantity of water required is generally a matter of convenience, although the amount must necessarily be sufficient to adequately disperse the sol. For this purpose, an amount at least equal, and preferably greater, than the volume of salt hydrolyzed is utilized in the hydrolytic reaction.

The co-gelation or co-precipitation of the alumina and silica gels by thoroughly admixing an alkali metal silicate with the alumina sol herein prepared is effected in accordance with the present process by merely admixing the respective aqueous solutions of alumina sol and alkali metal silicate until the mixture of alumina and silica co-gels precipitate. The amount of organic acid having a dissociation constant less than about $1 \times 10^{-3}$ in the aqueous dispersion of alumina sol required to precipitate the gel of silica is dependent upon the quantity of alkali metal silicate charged to the reaction mixture. The latter quantity of silicate is ultimately determined by the desired composition of the final silica-alumina composite. Generally speaking, suitable hydrocarbon cracking catalysts contain from about 85 to about 99.5% silica and the remainder the alumina component. In order to obtain such compositions, the mixture of alumina sol and alkali metal silicate must necessarily contain at least the theoretical proportion of alkali metal silicate to yield the desired quantity of silica in the ultimate composite, and the amount of organic acid required in the aqueous alumina sol dispersion must necessarily be sufficient to hydrolyze said above quantity of alkali metal silicate. In the production of an alumina-silica catalyst composite, containing about 5% alumina, for example, a typical composition suitable for use as a cracking catalyst, approximately one-third the theoretical molar requirement of acid necessary for reaction with the alkali metal silicate is supplied by hydrolysis of a basic aluminum acid salt in the formation of the aqueous dispersion of alumina sol. The remaining two-thirds of the theoretical molar equivalent of acid necessary to react with the alkali metal silicate to form the silica sol, therefore, must be added to the aqueous alumina sol solution prior to the addition thereto of the alkali metal silicate solution. For this purpose, any of the acids heretofore mentioned having a dissociation constant less than about $1 \times 10^{-3}$ may be utilized to provide the remaining acid requirement. The acid added to the aqueous alumina sol suspension may be the same or different than the acid formed by the hydrolysis of the basic aluminum acid salt, but in general, the acid must have a dissociation constant below $1 \times 10^{-3}$ to prevent premature precipitation of the alumina gel prior to the addition of the alkali metal silicate solution thereto.

It is sometimes advantageous to add ammonium hydroxide to the mixture of alkali metal silicate and alumina sol either before or after the spontaneous co-gelation.

The alkali metal silicates, which in the form of their aqueous solutions, are utilized in the present process to provide a source of silica gel in the co-gelation reaction are generally selected from either sodium or potassium meta-silicate, preferably sodium silicate, as the common water glass of commerce. The latter is the most economical source of alkali metal silicate utilizable in the present process and provides a wholly satisfactory source thereof. Aqueous solutions of the silicate in any suitable concentration may be employed in the present process, the concentrations appearing in the ordinary commercial water glass being sufficient to meet the requirements of the present process.

When prepared en masse by mixing a quantity of an aqueous solution of the alkali metal silicate with a quantity of the aqueous suspension of alumina sol, the mixture sets to a somewhat gelatinous mass following a short induction period commonly of from about 20 to about 30 seconds duration when the aqueous solutions are thoroughly and intimately mixed during or preceding the transformation of sols to their respective gels. When an alumina-silica composite is desired in the form of spherical particles, the induction period or time lag during the sol-to-gel transformation may be utilized to advantage for the comminution of the mixture of alumina and silica sols into spherically shaped droplets prior to the gel transformation, ultimately producing a spherically shaped alumina-silica catalyst composite. In the actual procedure, the aqueous mixture of alumina sol and alkali metal silicate is dispersed into droplets immediately after the sol and silicate are mixed and the droplets are then suspended in an immiscible fluid medium, such as a viscous oil bath, as the transformation of the sol mixture to the corresponding co-gels takes place. The droplets assume the shape of a spherical, semi-rigid globule, which may be subsequently dehydrated to form a substantially spherical, porous, rigid particle of the alumina-silica composite. In accordance with one method of preparation, for example, the two aqueous solutions, one containing the alumina sol and the other containing the alkali metal silicate, are mixed in proper proportions to form the final catalyst composite desired by admixing two continuously flowing streams of the respective solutions, thereafter stirring or otherwise mixing the two solutions to obtain intimate admixture of the respective reactants, and allowing the resulting aqueous mixture to flow onto the surface of a rapidly rotating disk, which forms droplets of the aqueous mixture at the periphery of a disk due to the centrifugal action of the rotating disk. The droplets, which at this point, still comprise a mixture of silica and alumina sols, drop into the oil bath and there assume a spherical shape by virtue of surface tension forces acting on the globule of mixed aqueous sol. While thus suspended in the oil bath, and as the droplets slowly descend toward the bottom of the suspending bath, the mixture of sols is converted into a semi-rigid, gelatinous globule of mixed silica and alumina hydrogels. The latter are removed from the bottom of the oil bath, separated from the oil, washed to remove alkali metal ions and dried to form the rigid spherical particles of silica-alumina composite. The dried gel spheres may be subsequently calcined to form spherically shaped catalyst particles, since the spherical shape of the original droplets of silica and alumina sol is retained by the dried particle of co-gels. The latter may be utilized as such to great advantage in hydrocarbon conversion processes, especially where fluidization techniques are employed.

The mixture of alumina and silica co-gels, whether precipitated en masse, or in the form of spherically shaped particles, is filtered, washed thoroughly, preferably by spraying with water or a dilute aqueous ammonium salt, such as ammonium chloride or carbonate, to remove practically all traces of alkali metal ions in the mixture of co-gels and either treated at this stage with other reagents for the introduction of other catalytic ions in the composite or dried as such to form an active alumina-silica cracking catalyst. The wet co-geled material may be treated, for example, with solutions of other ions (for example, solutions of zirconium chloride) to form an alumina-silica composite impregnated with the desired metallic ions. The impregnated composite may be then treated in any manner desirable to convert the metallic ions to the desired oxide or other derivative, and thereafter dried and calcined to form a composite of alumina-silica and the oxide of the metallic ion utilized to impregnate the composite of alumina and silica co-gels. Calcination of the alumina-silica composite is ordinarily effected by heating the dried composite of co-gels to a temperature of from about 450° to about 800° C. for a time sufficient to form a rigid catalyst particle capable of withstanding a considerable degree of surface pressure.

The calcined composite of alumina and silica herein obtained comprises an active catalyst for cracking hydrocarbons, for example, relatively high molecular weight hydrocarbons to form a product of relatively lower molecular weight useful as a motor fuel. Other typical uses of the alumina-silica composite, for example, is in the polymerization of olefins, particularly olefins of relatively low molecular weight such as ethylene, propylene, the butylenes, etc., and as a catalyst for alkylating aromatic hydrocarbons with long or short chain olefins. The catalysts herein prepared are especially desirable for the above hydrocarbon conversion reactions because of their porous structure and consequent low density, making the catalyst especially advantageous for use in fluidized processes.

The process of the present invention for the preparation of a composite of alumina and silica co-gels is described with reference to a particular composite in the following illustrative example. The example is intended merely to illustrate the present process, with no intent, however, to limit the scope of the invention in strict accordance thereto.

To a solution of 200 grams of "N-brand" water-glass (containing approximately 28% silicon dioxide) in one liter of water, there was added 200 cc. of an alumina sol, containing 6 grams of alumina, and 200 cc. of acetic acid. The alumina sol was prepared by the hydrolysis of basic aluminum acetate at a temperature of about 180° C. and in the presence of water at sufficient pressure to maintain substantially liquid phase. The mixture of water glass and alumina sol was a clear solution which gelled suddenly after being stirred for about ten minutes. The mixture was stirred with 200 cc. of additional water and was then filtered. The mixture of alumina and silica co-gels a gelatinous, milky white material, was stirred three times with two liter portions of water, and then twice with two liter portions of 0.1 normal ammonium chloride, and finally stirred five times with water until a sodium-free filtrate was obtained. The filtered gel was dried in an oven at 130° C. yielding 58 grams of product which was then crushed to pass through a 30-mesh screen. Calcination in an oven at 500° C. for three hours yielded 64 grams of material.

The ability of the catalyst to catalytically crack hydrocarbons was determined by passing a Mid-Continent gas oil fraction having an API gravity of about 31.4 and an initial boiling point of approximately 465° F. over a solid bed of the catalyst contained in a furnace maintained at a temperature of about 932° F. at a space velocity of approximately 4 volumes of said gas oil fraction per volume of catalyst per hour.

The liquid hydrocarbon product boiling at a temperature above about 400° F. was condensed in the receiver and the gaseous fraction together with the gasoline product boiling at a temperature below about 400° F. was collected in a separate vessel. The weight per cent conversion, expressed as the total weight of 400° F. end point gasoline made and uncondensed gas divided by the weight of the oil charged and the result multiplied by 100 for the present catalyst was 15.4% on a once-through basis.

I claim as my invention:

1. A process for the manufacture of an alumina-silica composite which comprises admixing an aqueous solution of an alkali metal silicate with an aqueous alumina sol containing in solution an organic acid having a dissociation constant of less than $1 \times 10^{-3}$ in sufficient quantity to hydrolyze said silicate to an aqueous silica sol and continuing the period of reaction for a time sufficient to form a precipitate of alumina and silica co-gel.

2. The process of claim 1 further characterized in that said organic acid is a fatty acid.

3. The process of claim 1 further characterized in that said organic acid is acetic acid.

4. The process of claim 1 further characterized in that said aqueous solution of an alkali metal silicate is a solution of sodium metasilicate.

5. A process for the manufacture of an alumina-silica composite which comprises admixing an aqueous solution of an alkali metal silicate with an aqueous alumina sol containing in solution an organic acid having a dissociation constant of less than $1 \times 10^{-3}$ in sufficient quantity to convert said silicate to an aqueous silica sol, continuing the period of reaction for a time sufficient to form a precipitate of alumina and silica co-gel, drying said precipitate of co-gel, and calcining the dried co-gel at a temperature of from 450° to about 800° C.

LOUIS SCHMERLING.

REFERENCES CITED

The following references are of record in the file of this patent:

UNITED STATES PATENTS

| Number | Name | Date |
| --- | --- | --- |
| 2,283,172 | Bates | May 19, 1942 |
| 2,317,803 | Reeves et al. | Apr. 27, 1943 |
| 2,356,303 | Connolly | Aug. 22, 1944 |
| 2,396,758 | Stratford | Mar. 19, 1946 |